United States Patent
Tseng et al.

(10) Patent No.: US 11,753,502 B2
(45) Date of Patent: Sep. 12, 2023

(54) OLIGOMER, COMPOSITION, PACKAGING STRUCTURE, AND METHOD OF DISASSEMBLING PACKAGING STRUCTURE

(71) Applicant: INDUSTRIAL TECHNOLOGY RESEARCH INSTITUTE, Hsinchu (TW)

(72) Inventors: Chi-Fu Tseng, Taipei (TW); Jauder Jeng, Zhudong Township (TW); Tien-Shou Shieh, Hsinchu (TW); Chin-Hui Chou, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/578,080

(22) Filed: Jan. 18, 2022

(65) Prior Publication Data

US 2023/0117528 A1 Apr. 20, 2023

(30) Foreign Application Priority Data

Oct. 14, 2021 (TW) ................ 110138097

(51) Int. Cl.
*C08L 79/08* (2006.01)
*C08G 63/78* (2006.01)

(52) U.S. Cl.
CPC .......... *C08G 63/78* (2013.01); *C08G 2115/00* (2021.01)

(58) Field of Classification Search
CPC ....... C09J 179/08; C09J 163/00; C08L 63/00; C08L 79/08; C08G 2115/00
See application file for complete search history.

(56) References Cited

U.S. PATENT DOCUMENTS

| | | | |
|---|---|---|---|
| 4,020,303 | A | 4/1977 | Jablonski et al. |
| 4,981,942 | A | 1/1991 | Bockrath et al. |
| 2003/0085388 | A1 | 5/2003 | Yu |
| 2003/0086666 | A1 | 5/2003 | Yu |
| 2003/0092869 | A1 | 5/2003 | Yu |
| 2003/0100681 | A1 | 5/2003 | Yu |
| 2012/0225309 | A1 | 9/2012 | Rout et al. |
| 2020/0165481 | A1* | 5/2020 | Shieh .................... C08G 59/42 |

FOREIGN PATENT DOCUMENTS

| | | |
|---|---|---|
| CN | 1313361 A | 9/2001 |
| CN | 110698644 A | 1/2020 |
| CN | 111234752 A | 6/2020 |
| JP | 2011-127011 A | 6/2011 |
| TW | 202035503 A | 10/2020 |
| TW | I716814 B | 1/2021 |

OTHER PUBLICATIONS

Hsiao et al Preparation of poly(amide4mide)s by direct polycondensation with triphenyl phosphite, 3a) Poly(amide-imide)s based on bis(trimellitimide)s, Makromol. Chem. 191, 155-167 (1990), published on Feb. 1990.*
USPTO structure search, published on May 2023.*
Partial English translation of Taiwanese Office Action for Taiwanese Application No. 110138097, dated Dec. 14, 2022.
Taiwanese Office Action for Appl. No. 110138097 dated Dec. 14, 2022.
Chin et al., "Curing behaviour and thermal properties of Epon 828 resin cured with diimide-diacid and phthalic anhydride", Polymer, 1998, vol. 39, No. 20, pp. 4923-4928.
Saedi, "Synthesis and Polymerization of N,N'-[Bis(4,4'-Hydroxypropyl Methacrylate Phenylester) Pyromellitimide] Thermoset Polymer by Microwave Irradiation", Scientific Research Publishing, Advances in Chemical Engineering and Science, 2016, vol. 6, pp. 183-189.

* cited by examiner

*Primary Examiner* — Gregory Listvoyb
(74) *Attorney, Agent, or Firm* — Birch, Stewart, Kolasch & Birch, LLP

(57) ABSTRACT

An oligomer is formed by reacting a diacid monomer with (a) epoxy resin or (b) glycidyl methacrylate, wherein the diacid monomer has a chemical structure of

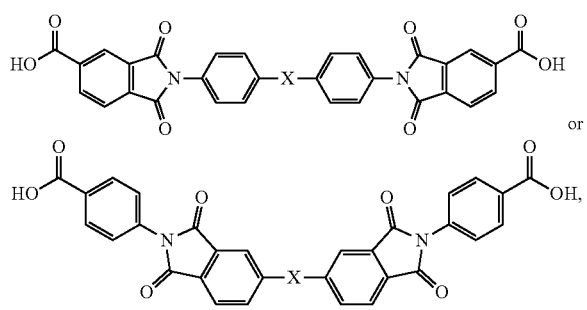

wherein X is —O—,

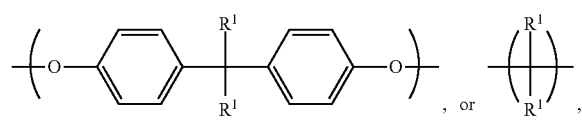

and each $R^1$ is independently $CH_3$, $CH_2F$, $CHF_2$, or $CF_3$. A composition containing the oligomer can be cured to serve as a sealant of an optoelectronic device, and the sealant can be lifted off by a laser beam irradiation.

5 Claims, No Drawings

OLIGOMER, COMPOSITION, PACKAGING STRUCTURE, AND METHOD OF DISASSEMBLING PACKAGING STRUCTURE

CROSS REFERENCE TO RELATED APPLICATIONS

The present application is based on, and claims priority from, Taiwan Application Serial Number 110138097, filed on Oct. 14, 2021, the disclosure of which is hereby incorporated by reference herein in its entirety.

TECHNICAL FIELD

The technical field relates to an oligomer, a composition, a packaging structure, and a method of disassembling the packaging structure.

BACKGROUND

The present mainstream of consumer electronic products use liquid-crystal display technology, and their recycling sources mainly include defective products during the panel assembly process and the electronic waste. Regardless of recycling the waste panel or reworking the defective products, the two glass substrates (such as the CF substrate and the TFT substrate) should first be completely separated before subsequent processing. Because traditional sealants cannot be disassembled after curing, a detachable sealant material is needed.

SUMMARY

One embodiment of the disclosure provides an oligomer, formed by reacting a diacid monomer with (a) epoxy resin or (b) glycidyl methacrylate, wherein the diacid monomer has a chemical structure of

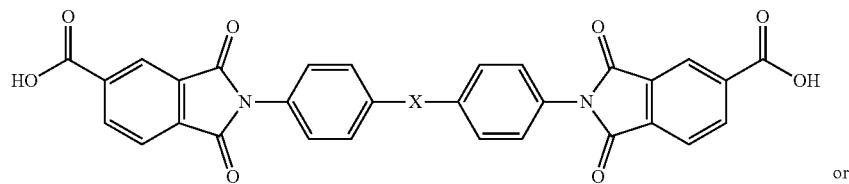

or

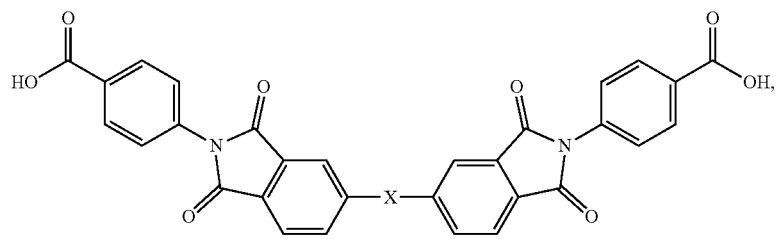

wherein X is —O—,

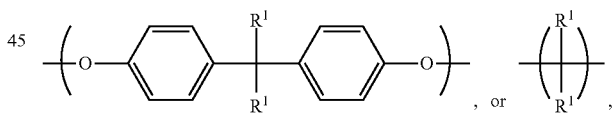

and each $R^1$ is independently $CH_3$, $CH_2F$, $CHF_2$, or $CF_3$.

One embodiment of the disclosure provides a composition, including: a first oligomer; a second oligomer, formed by reacting a compound containing acrylic acid group with a liquid aromatic epoxy resin; a compound containing multi-acrylate groups; an initiator; and a curing agent, wherein the first oligomer is formed by reacting a diacid monomer with (a) epoxy resin or (b) glycidyl methacrylate, wherein the diacid monomer has a chemical structure of

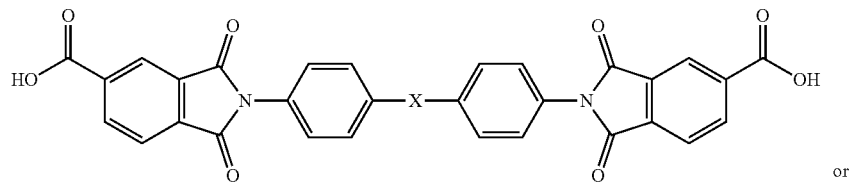

or

-continued

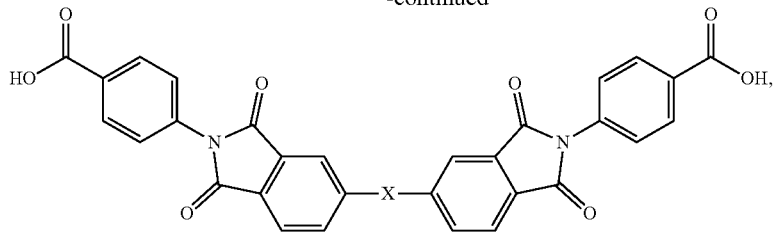

wherein X is —O—,

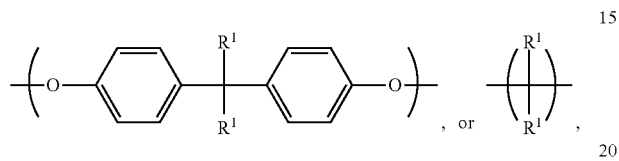

and each $R^1$ is independently $CH_3$, $CH_2F$, $CHF_2$, or $CF_3$.

One embodiment of the disclosure provides a packaging structure, including: an optoelectronic device; and a sealant applied around the edges of the optoelectronic device, wherein the sealant is formed by curing a composition, and the composition includes: a first oligomer; a second oligomer, formed by reacting a compound containing acrylic acid group with a liquid aromatic epoxy resin; a compound containing multi-acrylate groups; an initiator; and a curing agent, wherein the first oligomer is formed by reacting a diacid monomer with (a) epoxy resin or (b) glycidyl methacrylate, wherein the diacid monomer has a chemical structure of

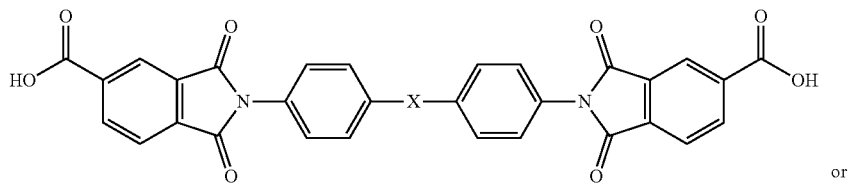

or

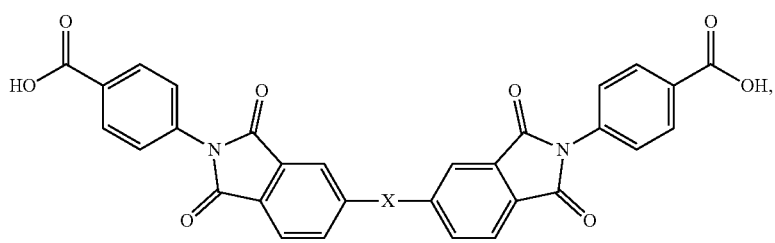

wherein X is —O—,

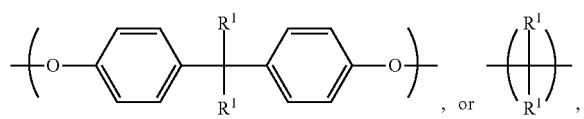

and each $R^1$ is independently $CH_3$, $CH_2F$, $CHF_2$, or $CF_3$.

One embodiment of the disclosure provides a method of disassembling a packaging structure, including: providing a packaging structure, wherein the packaging structure includes: an optoelectronic device; and a sealant applied around the edges of the optoelectronic device; and exposing the sealant to a laser for decomposing the sealant and disassembling the packaging structure, wherein the sealant is formed by curing a composition, and the composition includes: a first oligomer; a second oligomer, formed by reacting a compound containing acrylic acid group with a liquid aromatic epoxy resin; a compound containing multi-acrylate groups; an initiator; and a curing agent, wherein the first oligomer is formed by reacting a diacid monomer with (a) epoxy resin or (b) glycidyl methacrylate, wherein the diacid monomer has a chemical structure of

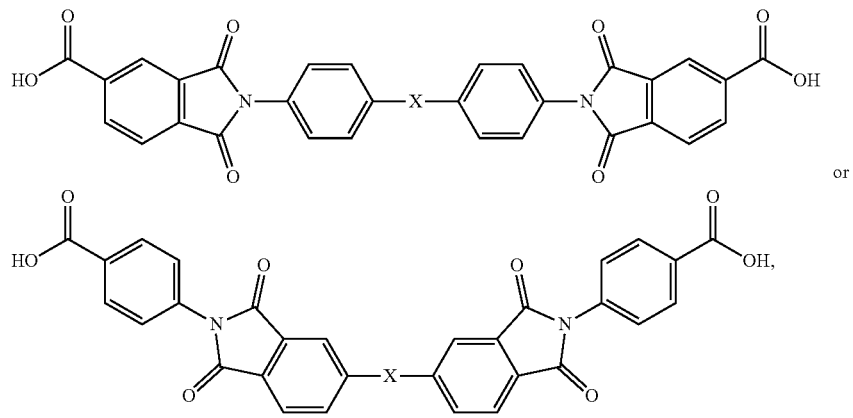

wherein X is —O—,

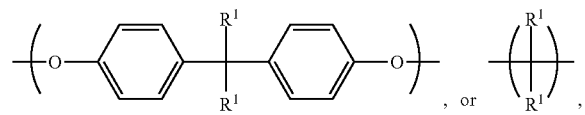

and each $R^1$ is independently $CH_3$, $CH_2F$, $CHF_2$, or $CF_3$.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In some embodiments of the disclosure, an oligomer, a composition, a packaging structure, and a method of disassembling the packaging structure are provided. In some embodiments, the substrates in an optoelectronic device are adhered by the sealant can be disassembled. In the composition for forming the sealant in the disclosure, the major segment of the oligomer contains an imide molecular structure to absorb a laser energy of 193 nm to 355 nm. In some embodiments, the oligomer has the molecular segment of the acrylate group or the epoxy group, such that the oligomer may absorb the laser pulse energy. As such, the sealant volume will expand rapidly and/or partial molecular chain of the resin will break, which is beneficial to lifting off the sealant from the substrate.

On the other hand, the composition is used as a sealant material for a liquid-crystal display process. The sealant material is not cured when it is first in contact with the liquid crystal. In general, the ion purity (e.g. chlorine ion concentration) in the sealant material will greatly influence the display quality of the panel, and the sealant material of the disclosure may prevent the ion related problem. After UV and thermal curing the sealant material, no sealant material is dissolved in the liquid crystal.

One embodiment of the disclosure provides an oligomer, formed by reacting a diacid monomer with (a) epoxy resin or (b) glycidyl methacrylate. The diacid monomer has a chemical structure of

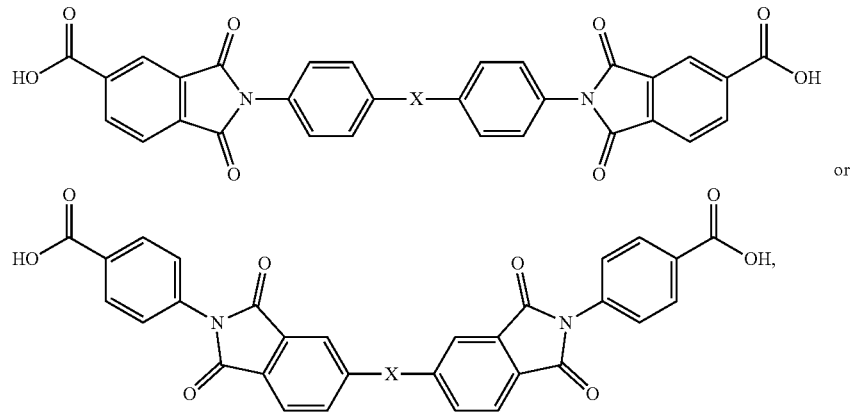

wherein X is —O—,

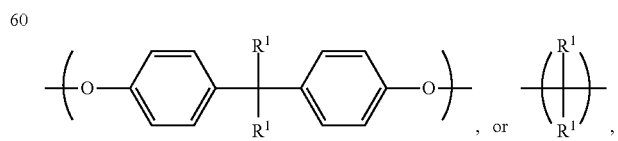

and each $R^1$ is independently $CH_3$, $CH_2F$, $CHF_2$, or $CF_3$.

In some embodiments, (a) epoxy resin includes (a1) liquid aromatic epoxy resin, which is in a liquid state at room temperature (e.g. about 18° C. to 35° C.). For example, (a1) liquid aromatic epoxy resin includes bisphenol A epoxy resin, bisphenol F epoxy resin, or a combination thereof. The bisphenol A epoxy resin has a chemical structure of

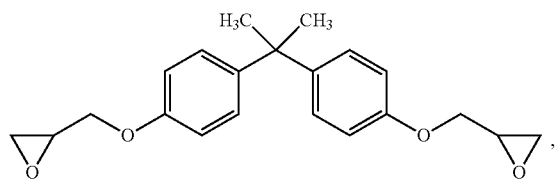 [SMILES: CC(C)(c1ccc(OCC2CO2)cc1)c1ccc(OCC2CO2)cc1]

and the bisphenol F epoxy resin has a chemical structure of

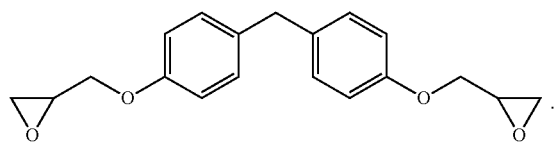 [SMILES: c1cc(OCC2CO2)ccc1Cc1ccc(OCC2CO2)cc1]

In some embodiments, (a) epoxy resin further includes (a2) liquid aliphatic epoxy resin. The liquid aliphatic epoxy resin is in a liquid state at room temperature (e.g. about 18° C. to 35° C.). For example, (a2) liquid aliphatic epoxy resin includes $C_{3-10}$ alkylene glycol diglycidyl ether (e.g. 1,6-hexanediol diglycidyl ether having a chemical structure of

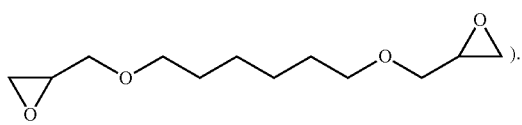 [SMILES: C(CCCOCC1CO1)CCOCC1CO1]

In some embodiments, (a) epoxy resin is (a1) liquid aromatic epoxy resin, and the diacid monomer and (a1) liquid aromatic epoxy resin have a molar ratio of 1:2 to 1:8 or 1:2.5 to 1:5. If the amount of (a1) liquid aromatic epoxy resin is too low, the diacid monomer and the epoxy resin are difficult to form a homogeneous phase. If the amount of (a1) liquid aromatic epoxy resin is too high, the viscosity of the oligomer will be too high to be used as a sealant material. In some embodiments, (a) epoxy resin is a combination of (a1) liquid aromatic epoxy resin and (a2) liquid aliphatic epoxy resin, in which the diacid monomer and (a1) liquid aromatic epoxy resin have a molar ratio of 1:2 to 1:8 or 1:2.5 to 1:5, and the diacid monomer and (a2) liquid aliphatic epoxy resin have a molar ratio of 1:2 to 1:7 or 1:3 to 1:6. If the amount of (a1) liquid aromatic epoxy resin is too low, the diacid monomer and the epoxy resin are difficult to form a homogeneous phase. If the amount of (a1) liquid aromatic epoxy resin is too high, the viscosity of the oligomer will be too high to be used as a sealant material. If the amount of (a2) liquid aliphatic epoxy resin is too low, the diacid monomer and the epoxy resin are difficult to form a homogeneous phase in a short time. If the amount of (a2) liquid aliphatic epoxy resin is too high, the content of the diacid monomer in the oligomer will be too low to facilitate the laser disassemble process.

In some embodiment, the oligomer is formed by reacting the diacid monomer with (b) glycidyl methacrylate, in which the diacid monomer and (b) glycidyl methacrylate have a molar ratio of 1:10 to 1:20 or 1:15 to 1:18. If the amount of (b) glycidyl methacrylate is too low, the diacid monomer and the epoxy resin are difficult to form a homogeneous phase. If the amount of (b) glycidyl methacrylate amount is too high, the content of the diacid monomer in the oligomer will be too low to facilitate the laser disassemble process. The (b) glycidyl methacrylate has a chemical structure of

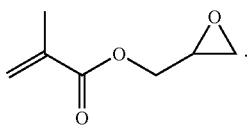

In some embodiments, the oligomer may have a weight average molecular weight of 300,000 g/mol to 800,000 g/mol. If the weight average molecular weight of the oligomer is too low, the mechanical properties of the cured sealant material will be poor. If the weight average molecular weight of the oligomer is too high, the oligomer will be difficult to process. In some embodiments, both ends of the oligomer are epoxy groups, and the oligomer can be used as an epoxy binder resin.

One embodiment of the disclosure provides a composition, including: a first oligomer; a second oligomer, formed by reacting a compound containing acrylic acid group with a liquid aromatic epoxy resin; a compound containing multi-acrylate groups; an initiator; and a curing agent. The first oligomer can be the described oligomer, and its detail description is not repeated here.

In some embodiments, the viscosity of the composition can be 250,000 cops to 400,000 cps.

In the second oligomer (formed by reacting a compound containing acrylic acid group with a liquid aromatic epoxy resin), the compound containing acrylic acid group can be acrylic acid, and the liquid aromatic epoxy resin can be bisphenol A epoxy resin or bisphenol F epoxy resin. The compound containing acrylic acid group and the liquid aromatic epoxy resin may have a molar ratio of 1:1.05 to 1:1.5 or 1:1.05 to 1:1.33. If the amount of the liquid aromatic epoxy resin is too low, the second oligomer cannot efficiently react with the first oligomer during thermally curing the sealant material. If the amount of the liquid aromatic epoxy resin is too high, the UV reaction conversion ratio will be insufficient during UV curing the sealant material. In some embodiments, the second oligomer may have a weight average molecular weight of 100,000 g/mol to 500,000 g/mol. If the weight average molecular weight of the second oligomer is too low, the mechanical properties of the cured sealant material will be poor. If the weight average molecular weight of the second oligomer is too high, the second oligomer will difficult to process. In some embodiments, the first oligomer and the second oligomer have a weight ratio of 1:1 to 1:10 or 1:1.5 to 1:6. If the amount of the second oligomer is too low, the UV reaction conversion ratio will be insufficient during UV curing the sealant material. If the amount of the second oligomer is too high, the sealant material is not beneficial to the laser disassemble process.

In some embodiments, the compound containing multi-acrylate groups can be dipentaerythritol penta-/hexa-acrylate (DPHA), trimethylolpropane triacrylate (TMPTA), pentaerythritol tetraacrylate (PETTA), dipentaerythritol pentaacrylate (DPEPA), ethoxylated trimethylolpropane triacrylate (SR454), pentaerythritol triacrylate (SR444), or a combination thereof. In some embodiments, the first oligomer and the compound containing multi-acrylate groups may have a weight ratio of 1:0.05 to 1:0.5 or 1:0.09 to 1:0.38. If the amount of the compound containing multi-acrylate groups is too low, the UV reaction conversion ratio will be insufficient during UV curing the sealant material. If the amount of the compound containing multi-acrylate groups is too high, the mechanical properties of the cured sealant material will be poor.

In some embodiments, the initiator can be photo initiator, photo initiator, or a combination thereof, which can be exposed or heated to generate radicals for polymerizing the double bonds. In some embodiments, the first oligomer and the initiator have a weight ratio of 1:0.01 to 1:0.4 or 1:0.06 to 1:0.15. If the amount of the initiator is too low, the UV or thermal reaction conversion ratio will be insufficient during UV or thermal curing the sealant material. If the amount of the initiator is too high, the mechanical properties of the cured sealant material will be poor.

In some embodiments, the curing agent may further crosslink and cure the resin. For example, the curing agent can be 2-phenyl imidazole (2PZ), diaminodiphenyl sulfone (DDS), boron trifluoride-amine complex (BF3-MEA), dicyandiamide (DICY), or a combination thereof. In some embodiments, the first oligomer and the curing agent may have a weight ratio of 1:0.03 to 1:0.18. If the amount of the curing agent amount is too low, the curing conversion ratio will be insufficient during thermal curing the sealant material. If the amount of the curing agent amount is too high, the storage stability of the sealant material will be poor.

In some embodiments, another auxiliary agent such as inorganic filler, flame retardant agent, levelling agent, another suitable auxiliary agent, or a combination thereof can be optionally added to the composition, depending on the required properties.

One embodiment of the disclosure provides a packaging structure, including: an optoelectronic device; and a sealant applied around the edges of the optoelectronic device, wherein the sealant is formed by curing the described composition, In some embodiments, the optoelectronic device includes a liquid-crystal display, a quantum dot light-emitting diode display, an organic light-emitting diode display, or a solar cell. Because the oligomer in the compositing has a backbone containing an imide group (which may absorb at the laser wavelength of 193 nm to 355 nm), the sealant can be exposed to a laser of 355 nm to be decomposed, thereby disassembling the packaging structure.

When the optoelectronic device is the liquid-crystal display, the sealant material of the disclosure does not influence the liquid-crystal content, and not dissolved in the liquid-crystal after the UV curing and thermal curing processes. Note that the composition of the disclosure is not only used as the sealant for the liquid-crystal display, but also used as the sealant for other displays (e.g. the quantum dot light-emitting diode display, the organic light-emitting diode display, or another suitable display) or the solar cell, because the sealant has a high adhesive strength to the substrate and can be disassembled after being exposed to the laser.

The disclosure also provides a method of disassembling a packaging structure, including: providing the described packaging structure, and exposing the sealant to a laser for decomposing the sealant and disassembling the packaging structure. In some embodiments, the laser wavelength is 355 nm, and the laser intensity can be 20 $\mu J/cm^2$ to 120 $\mu J/cm^2$ (Power external: 50 kHz). If the laser intensity is too low, the packaging structure cannot be efficiently disassembled. If the laser intensity is too high, the ITO glass and the TFT substrate will be possibly flat-ironed, which may increase the resistance of ITO and break the metal conductor of the TFT substrate. As such, the disassembled substrate cannot be used again.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Synthesis Example 1-1

2 molar parts of 4-aminobenzoic acid, 1 molar part of 4,4'-bisphenol A dianhydride (BPADA), and catalyst amount of isoquinoline were added to a solvent of γ-butyrolactone (GBL), and then heated to 200° C. to react for 4 hours to form a monomer ABP. The monomer ABP had a chemical structure as illustrated below:

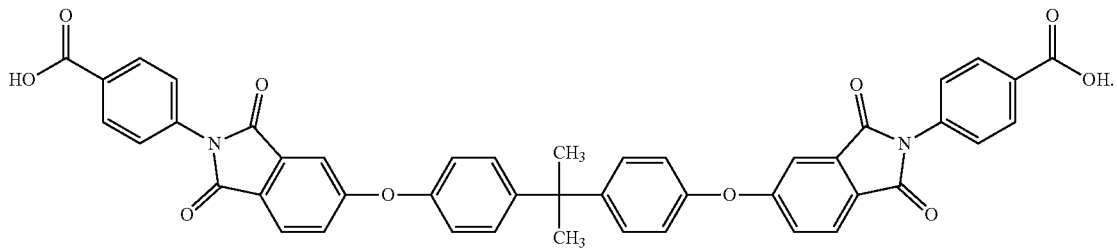 [SMILES: CC(C)(c1ccc(Oc2ccc3c(c2)C(=O)N(c2ccc(C(=O)O)cc2)C3=O)cc1)c1ccc(Oc2ccc3c(c2)C(=O)N(c2ccc(C(=O)O)cc2)C3=O)cc1]

Synthesis Example 1-2

2 molar parts of 1,2,4-trimellitic anhydride (TMA), 1 molar part of 4,4'-oxydianiline (ODA), and catalyst amount of isoquinoline were added to a solvent of GBL, and then heated to 200° C. to react for 4 hours to form a monomer ODT. The monomer ODT had a chemical structure as illustrated below:

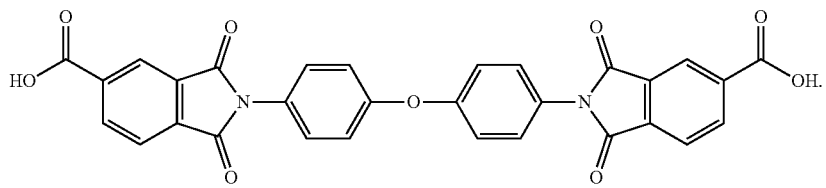 [SMILES: O=C(O)c1ccc2c(c1)C(=O)N(c1ccc(Oc3ccc(N4C(=O)c5ccc(C(=O)O)cc5C4=O)cc3)cc1)C2=O]

Synthesis Example 1-3

2 molar parts of p-aminobenzoic acid, 1 molar part of 4,4'-(hexafluoroisopropylidene) diphthalic anhydride (6FDA), and catalyst amount of isoquinoline were added to a solvent of GBL, and then heated to 200° C. to react for 4 hours to form a monomer A6F. The monomer A6F had a chemical structure as illustrated below:

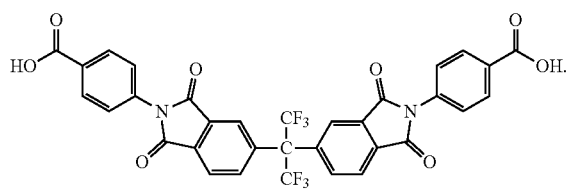 [SMILES: O=C(O)c1ccc(N2C(=O)c3ccc(C(c4ccc5c(c4)C(=O)N(c4ccc(C(=O)O)cc4)C5=O)(C(F)(F)F)C(F)(F)F)cc3C2=O)cc1]

Synthesis Example 1-4

2 molar parts of TMA, 1 molar part of 2,2-bis [4-(4-aminophenoxy)phenyl] propane (BAPP), and catalyst amount of isoquinoline were added to a solvent of GBL, and then heated to 200° C. to react for 4 hours to form a monomer BAT. The monomer BAT had a chemical structure as illustrated below:

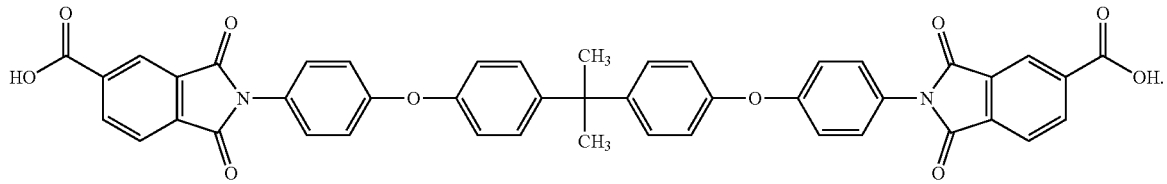 [SMILES: CC(C)(c1ccc(Oc2ccc(N3C(=O)c4ccc(C(=O)O)cc4C3=O)cc2)cc1)c1ccc(Oc2ccc(N3C(=O)c4ccc(C(=O)O)cc4C3=O)cc2)cc1]

Synthesis Example 2-1

15 parts by weight of the monomer ABP (0.02 equivalent mole), 15 parts by weight of bisphenol F epoxy resin (0.09 equivalent mole), and 15 parts by weight of 1,6-hexanediol diglycidyl ether (HDGE, 0.07 equivalent mole) were mixed, and then heated to 150° C. to react for 4 hours to form ABP binder resin.

Synthesis Example 2-2

15 parts by weight of the monomer ODT (0.03 equivalent mole), 15 parts by weight of bisphenol F epoxy resin (0.09 equivalent mole), and 30 parts by weight of HDGE (0.13 equivalent mole) were mixed, and then heated to 150° C. to react for 2 hours to form ODT binder resin.

Synthesis Example 2-3

15 parts by weight of the monomer A6F (0.02 equivalent mole) and 15 parts by weight of bisphenol F epoxy resin (0.09 equivalent mole) were mixed, and then heated to 150° C. to react for 3 hours to form A6F binder resin.

Synthesis Example 2-4

15 parts by weight of the monomer BAT (0.03 equivalent mole), 15 parts by weight of bisphenol F epoxy resin (0.09 equivalent mole), and 30 parts by weight of HDGE (0.13 equivalent mole) were mixed, and then heated to 150° C. to react for 2 hours to form BAT binder resin.

Synthesis Example 2-5

15 parts by weight of the monomer ABP (0.02 equivalent mole), 50 parts by weight of glycidyl methacrylate (GMA, 0.35 equivalent mole), and 0.02 parts by weight of a catalyst triphenyl phosphate (TPP) were mixed, and then heated to 130° C. to react for 4 hours to form ABP acrylate epoxy binder resin.

Synthesis Example 2-6

80.75 parts by weight of bisphenol F epoxy resin (0.475 equivalent mole), 35.52 parts by weight of acrylic acid (AA, 0.45 equivalent mole), 0.291 parts by weight of the catalyst TPP, and 0.078 parts by weight of a thermal inhibitor Hydroquinone monomethyl ether (MEHQ) were mixed, and then heated to 110° C. to react for 5 hours to form Acrylate binder resin.

Synthesis Example 2-7

15 parts by weight of the monomer ABP (0.02 equivalent mole) and 30 parts by weight of hydrogenated bisphenol A epoxy resin (0.136 equivalent mole) were mixed, and then heated to 130° C. to react. However, the reaction mixture was gelled and could not be further used.

Example 1

5 g of ABP binder resin (first oligomer), 30 g of Acrylate binder resin (Synthesis Example 2-6, second oligomer), 1.88 g of dipentaerythritol penta-/hexa-acrylate (DPHA), 5.33 g of talc serving as inorganic filler, 0.65 g of free radical photo initiator IRGACURE 819 (Phenylbis(2,4,6-trimethyl benzoyl)phosphineoxide), 0.7 g of free radical thermal initiator benzoyl Peroxide (BPO), and 0.87 g of thermal curing agent 2-phenyl imidazole (2PZ) were mixed and ground at room temperature, and then stirred and defoamed to obtain a resin composition. The viscosity of the resin composition was measured using a Brookfield viscometer at 25° C. with a cone spindle #CP-52 and a rotation speed of 1.0 rpm, thereby obtaining its viscosity of about 250,000 cps. The resin composition was coated onto a glass substrate to form a coating layer with a thickness of about 50 μm, and then exposed to an ultraviolet radiation at 365 nm and 1,500 mJ/cm², and then put into an oven to be cured at 120° C. for 30 minutes. The transmittance ratio for a light of wavelength 355 nm of the cured layer was measured using an Agilent 8453 Spectrophotometer (UV-VIS instrument).

The resin composition was coated onto the edges of an ITO glass substrate by a dispenser, and the ITO glass was then attached and pressed to another ITO glass substrate. The laminated sample was exposed to an ultraviolet radiation of 365 nm and 1,500 mJ/cm², and then put into an oven at 120 for 30 minutes to form a sealant adhering the two ITO glass substrates. The sample was tested by a tensile rate of 20 mm/min in a dual-column tensile machine (QC Teck) to measure its tensile shear strength, which means the adhesion force of the sealant. Thereafter, a laser with a wavelength of 355 nm and an intensity of 70 μJ/cm² per Hertz (Power external: 50 kHz) was applied by KYO Nano DPSS Dot Beam Type LLO to the sealant for lifting off the sealant to calculate the lift-off ratio.

Example 2

Example 2 was similar to Example 1, and the difference in Example 2 was 5 g of ABP binder resin being replaced with 20 g of ABP binder resin. The other constituents of the resin composition and the method of measuring the sealant were similar to those in Example 1. The viscosity of the resin composition was about 450,000 cps.

Example 3

Example 3 was similar to Example 1, and the difference in Example 3 was 5 g of ABP binder resin being replaced with 5 g of ODT binder resin. The other constituents of the resin composition and the method of measuring the sealant were similar to those in Example 1. The viscosity of the resin composition was about 380,000 cps.

Example 4

Example 4 was similar to Example 1, and the difference in Example 4 was 5 g of ABP binder resin being replaced with 10 g of A6F binder resin. The other constituents of the resin composition and the method of measuring the sealant were similar to those in Example 1. The viscosity of the resin composition was about 350,000 cps.

Example 5

Example 5 was similar to Example 1, and the difference in Example 5 was 5 g of ABP binder resin being replaced with 5 g of BAT binder resin. The other constituents of the resin composition and the method of measuring the sealant were similar to those in Example 1. The viscosity of the resin composition was about 280,000 cps.

Example 6

Example 6 was similar to Example 1, and the difference in Example 6 was 5 g of ABP binder resin being replaced with 15 g of ABP acrylate epoxy binder resin. The other constituents of the resin composition and the method of measuring the sealant were similar to those in Example 1. The viscosity of the resin composition was about 350,000 cps.

Example 7

Example 7 was similar to Example 1, and the difference in Example 7 was 5 g of ABP binder resin being replaced with 5 g of ABP binder resin and 15 g of ABP acrylate epoxy binder resin. The other constituents of the resin composition and the method of measuring the sealant were similar to those in Example 1. The viscosity of the resin composition was about 300,000 cps.

Example 8

Example 8 was similar to Example 1, and the difference in Example 8 was 5 g of ABP binder resin being replaced with 22 g of ABP binder resin, and 1.88 g of DPHA being replaced with 2.88 g of DPHA. The other constituents of the resin composition and the method of measuring the sealant were similar to those in Example 1. The viscosity of the resin composition was about 300,000 cps.

Comparative Example 1

Comparative Example 1 was similar to Example 1, and the difference in Comparative Example 1 was 5 g of ABP binder resin being replaced with 5 g of bisphenol F epoxy resin. The other constituents of the resin composition and the method of measuring the sealant were similar to those in Example 1. The viscosity of the resin composition was about 200,000 cps.

Comparative Example 2

Comparative Example 2 was similar to Example 1, and the difference in Comparative Example 2 was 5 g of ABP binder resin being replaced with 15 g of bisphenol F epoxy resin. The other constituents of the resin composition and the method of measuring the sealant were similar to those in Example 1. The viscosity of the resin composition was about 120,000 cps.

TABLE 1

| | Epoxy binder | Acrylate binder | Transmittance ratio for 355 nm | Tensile shear strength (kgf/mm²) | Laser lift-off ratio |
|---|---|---|---|---|---|
| Example 1 | ABP binder (5 g) | 30 g | 25.67% | 4.6 | 61.71% |
| Example 2 | ABP binder (20 g) | 30 g | 18.58% | 3.9 | 72.26% |
| Example 3 | ODT binder (5 g) | 30 g | 30.42% | 4.7 | 51.08% |
| Example 4 | A6F binder (10 g) | 30 g | 51.34% | 2.1 | 31.55% |
| Example 5 | BAT binder (5 g) | 30 g | 42.63% | 2.4 | 37.19% |
| Example 6 | ABP acrylate epoxy binder (15 g) | 30 g | 20.94% | 4.1 | 67.54% |

TABLE 1-continued

| | Epoxy binder | Acrylate binder | Transmittance ratio for 355 nm | Tensile shear strength (kgf/mm²) | Laser lift-off ratio |
|---|---|---|---|---|---|
| Example 7 | ABP binder (5 g) + ABP acrylate epoxy binder (15 g) | 30 g | 18.11% | 2.9 | 74.25% |
| Example 8 | ABP binder (22 g) | 30 g | 17.01% | 2.9 | 82.25% |
| Comparative Example 1 | Bisphenol F epoxy resin (5 g) | 30 g | 58.19% | 2.76 | 9.1% |
| Comparative Example 2 | Bisphenol F epoxy resin (15 g) | 30 g | 58.54% | 2.74 | 8.8% |

As the Examples and Comparative Examples show, the compositions for forming the sealants in the disclosure had the epoxy binders of the specific structures, respectively. As such, the sealants had the acceptable adhesion force before exposure to the laser and high lift-off ratio after exposure to the laser.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A composition, comprising
    a first oligomer;
    a second oligomer, formed by reacting a compound containing acrylic acid group with a liquid aromatic epoxy resin;
    a compound containing multi-acrylic groups;
    a curing agent,
    wherein the first oligomer is formed by reacting a diacid monomer with (a) epoxy resin or (b) glycidyl methacrylate, wherein the diacid monomer has a chemical structure of

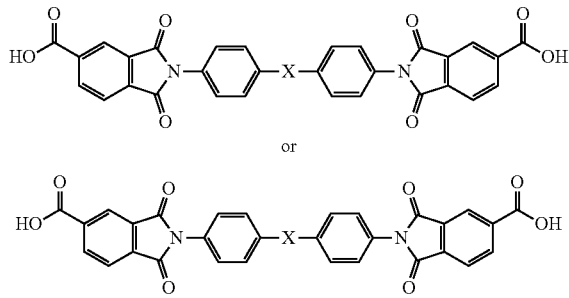

wherein X is —O—,

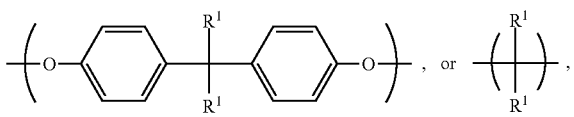

and each $R^1$ is independently $CH_3$, $CH_2F$, $CHF_2$, or $CF_3$.

2. The oligomer as claimed in claim 1, wherein the compound containing acrylic acid group and the liquid aromatic epoxy resin have a molar ratio of 1:1.05 to 1:1.5.

3. The composition as claimed in claim 1, wherein first oligomer and the second oligomer have a weight ratio of 1:1 to 1:10.

4. The composition as claimed in claim 1, wherein the compound containing multi-acrylate groups comprises dipentaerythritol penta-/hexa-acrylate (DPHA), trimethylolpropane triacrylate (TMPTA), pentaerythritol tetraacrylate (PETTA), dipentaerythritol pentaacrylate (DPEPA), ethoxylated trimethylolpropane triacrylate (SR454), pentaerythritol triacrylate (SR444), or a combination thereof.

5. The composition as claimed in claim 1, wherein the first oligomer and the compound containing multi-acrylate groups have a weight ratio of 1:0.05 to 1:0.5.

* * * * *